(12) United States Patent
Kim et al.

(10) Patent No.: US 11,606,003 B1
(45) Date of Patent: Mar. 14, 2023

(54) PORTABLE POWER GENERATING SYSTEM USES ROTATING TABLE

(71) Applicant: K-TECHNOLOGY USA INC, Los Angeles, CA (US)

(72) Inventors: Ki Il Kim, Los Angeles, CA (US); Young Kim, Los Angeles, CA (US)

(73) Assignee: K-TECHNOLOGY USA INC, Los Angeles, CA (US)

( * ) Notice: Subject to any disclaimer, the term of this patent is extended or adjusted under 35 U.S.C. 154(b) by 0 days.

(21) Appl. No.: 17/901,735

(22) Filed: Sep. 1, 2022

(51) Int. Cl.
*H02K 7/18* (2006.01)
*H02K 7/116* (2006.01)
*H02K 7/08* (2006.01)

(52) U.S. Cl.
CPC .............. *H02K 7/183* (2013.01); *H02K 7/08* (2013.01); *H02K 7/116* (2013.01)

(58) Field of Classification Search
CPC ........... H02K 7/183; H02K 7/08; H02K 7/116
USPC ...................................................... 290/44, 55
See application file for complete search history.

(56) References Cited

U.S. PATENT DOCUMENTS

| | | | |
|---|---|---|---|
| 8,080,895 B1* | 12/2011 | Williams ................ | F03B 13/00 290/55 |
| 8,872,368 B1* | 10/2014 | Kim, II .................. | B61D 43/00 290/3 |
| 9,160,222 B1* | 10/2015 | Kim, II .................. | H02K 47/00 |
| 2011/0133453 A1* | 6/2011 | Merswolke ........... | F03D 7/0276 290/44 |
| 2011/0156400 A1* | 6/2011 | Lowe ....................... | F03G 7/10 290/55 |
| 2012/0308387 A1* | 12/2012 | Himmelmann ......... | F03D 15/10 474/84 |
| 2013/0292946 A1* | 11/2013 | Himmelmann ......... | F16H 15/22 290/55 |
| 2013/0343889 A1* | 12/2013 | Himmelmann ......... | F03D 15/00 416/170 R |
| 2015/0108757 A1* | 4/2015 | Farr ......................... | F03D 9/25 290/55 |
| 2019/0341822 A1* | 11/2019 | Kim ....................... | H02K 7/116 |

FOREIGN PATENT DOCUMENTS

KR 20100049721 A * 5/2010
WO WO-2014023102 A1 * 2/2014 ............. F03D 1/065

* cited by examiner

*Primary Examiner* — Charles Reid, Jr.
(74) *Attorney, Agent, or Firm* — Novick, Kim & Lee PLLC; Jae Youn Kim

(57) ABSTRACT

Provided is a portable power generating system including a base, an electric motor fixed on the base, a circular rotating table located at a center of the base and rotated by the electric motor, and two or more power generators fixed on the base and driven by the circular rotating table. Further, the system includes an extended generator shaft where magnet rollers are attached for increasing centripetal force and rotating on the rotating table in one direction. Also, a battery is provided for starting the system.

14 Claims, 4 Drawing Sheets

PORTABLE POWER GENERATING SYSTEM USES ROTATING TABLE

BACKGROUND OF THE INVENTION

One or more embodiments of the present invention relate to an apparatus with two or more power generators rotating on a large gear table driven by a circular table that is driven by an electric motor with a magnet roller or a wind turbine power.

SUMMARY OF THE INVENTION

According to an aspect of the present invention, an apparatus with power generators is provided. The apparatus has a base; an electric motor fixed on the base; a circular rotating table located at a center of the base and rotated by the electric motor; and two or more power generators fixed on the base and driven by the circular rotating table, thereby generating electric power.

According to an embodiment of the present invention, the electric motor includes a shaft having a first plurality of gear teeth to engage a second plurality of gear teeth located on the circumferential edge of the circular rotating table so as to rotate the circular rotating table.

According to an embodiment of the present invention, the apparatus has a center post configured to hold the circular rotating table, wherein the center post and the circular rotating table are connected with each other through at least one thrust bearing.

According to an embodiment of the present invention, the circular rotating table includes at least one opening located between the post and the circumferential edge.

According to an embodiment of the present invention, each of the two or more power generators includes a third plurality of gear teeth configured to engage the second plurality of gear teeth of the circular rotating table.

According to an embodiment of the present invention, the gear ratio between the first plurality of gear teeth and the second plurality of gear teeth is same as the gear ratio between the third plurality of gear teeth and the second plurality of gear teeth, thereby rotating the two or more power generators at the same RPM as the electric motor.

According to an embodiment of the present invention, the two or more power generators are connected with one another through an electric wire.

According to an embodiment of the present invention, one of the two or more power generators is connected to a power transformer to supply the generated power to a battery/grid or the electric motor.

Another aspect of the present invention is to provide a method for generating electric power by using the apparatus with two or more power generators.

BRIEF DESCRIPTION OF THE DRAWINGS

These and other aspects will become apparent and more readily appreciated from the following description of the embodiments, taken in conjunction with the accompanying drawings of which.

The features and advantages of the present invention will become more apparent from the detailed description set forth below when taken in conjunction with the drawings in which like reference numbers indicate identical or functionally similar elements.

DETAILED DESCRIPTION

Figure 1:
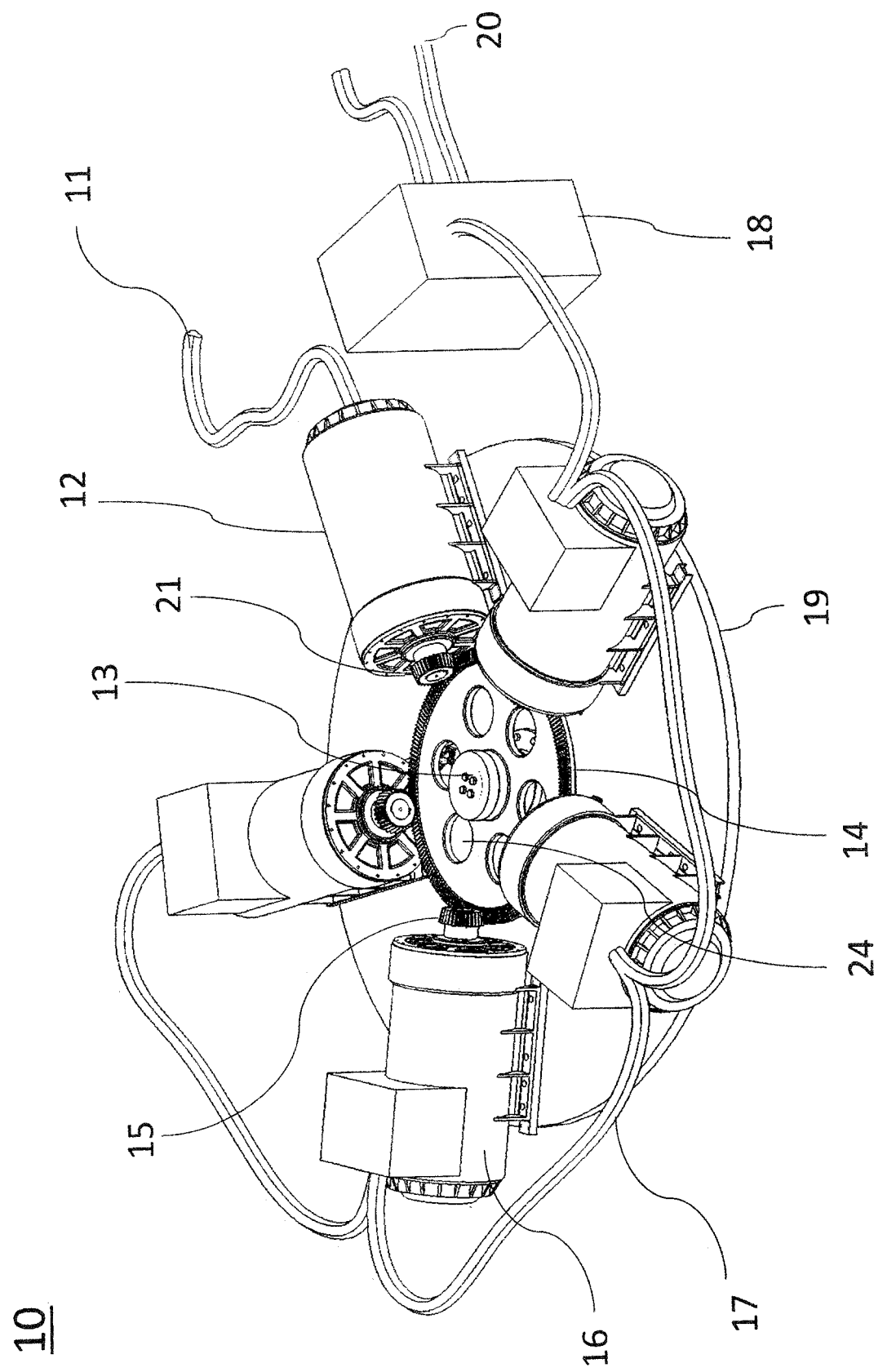
FIG. 1 is a perspective view of an electric power generating system of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second", and the like may be used to describe various elements, but do not limit the elements. Such terms are only used to classify one element from another.

These and/or other aspects will become apparent and more readily appreciated from the following description of embodiments of the present invention, taken in conjunction with the accompanying drawing.

According to an aspect of the present invention and referring to FIG. 1, an apparatus (10) is provided which has a base (19); an electric motor (12) fixed on the base (19); a circular rotating table (14) located at a center of the base (19) and rotated by the electric motor (12); and two or more power generators (16) fixed on the base (19) and driven by the circular rotating table (14), thereby generating electric power.

The electric motor (12) includes a shaft (21) having a first plurality of gear teeth to engage a second plurality of gear teeth located on the circumferential edge of the circular rotating table (14) so as to rotate the circular rotating table (14). In a preferred embodiment, the electric motor (12) may be capable of providing 100 hp with a RPM of 1,800. Also, the power generator (16) may have the capacity of generating 50 kw to 400 kW. The generator or motor may be adapted of the MGM Compro® which is 50% lighter than other conventional generator or a motor as well as greater togue, now drone industries already been used. Furthermore, this invention may be adapted nano wires of graphene wires, carbon nano tube (CNT) wires or composite wires of graphene/CNT/cooper wires for winding new generators made by Boronite Inc®.

Figure 2:
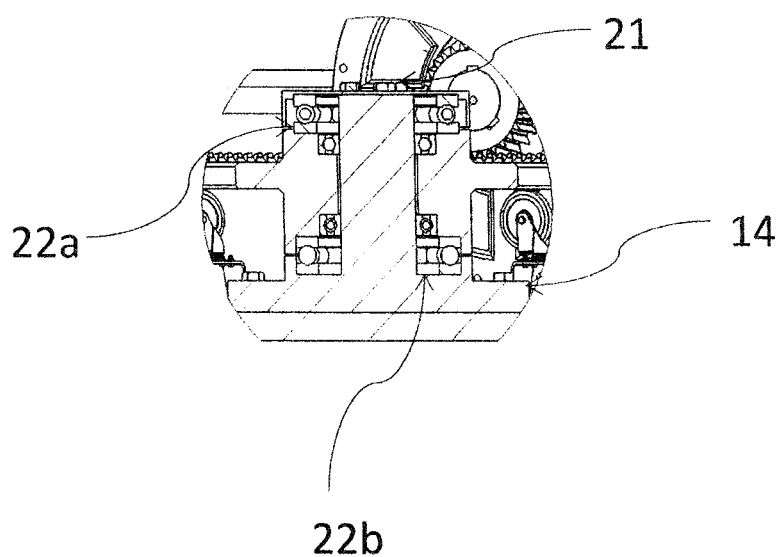
FIG. 2 is a sectional view of the circular rotating table of the apparatus of FIG. 1.

Further, the apparatus (10) has a center post (13) configured to hold the circular rotating table (14), wherein the center post (13) and the circular rotating table (14) are connected with each other through at least one thrust bearing (22a and 22b). In a preferred embodiment, the center post (13) and the circular rotating table are connected with each other through an upper thrust bearing (22a) and a lower thrust bearing (22b) located between the circular rotating table (14) and the center post (13) as shown in FIG. 2.

Further, the circular rotating table (14) includes at least one opening (24) located between the post (13) and the circumferential edge of the circular rotating table (14). In a preferred embodiment, the circular rotating table (14) may have a diameter of 6.5 fts, and there are six openings (24) in a circular shape in the circular rotating table (14). However, the shape of the opening (24) may be modified such as oval, rectangular, triangle, and the like to reduce the weight of the circular rotating table (14) and to increase centrifugal force of the circular rotating table (14).

Further, each of the two or more power generators (16) has a rotating shaft (15) with a third plurality of gear teeth configured to engage the second plurality of gear teeth of the circular rotating table (14). In a preferred embodiment, the apparatus may have four power generators (16) located on the base (19) with an equal distance with one another, and all of the power generators (16) are axially located with respect to the circular rotating table (14) so that the front part with the shaft (15) faces the center post (13) of the power generating system (10).

According to an embodiment of the present invention, the gear ratio between the first plurality of gear teeth and the second plurality of gear teeth is same as the gear ratio between the third plurality of gear teeth and the second plurality of gear teeth, thereby rotating the two or more power generators (16) at the same RPM as the electric motor (12). The electric motor (12) is connected to the AC power or DC power (11) to be driven by the electric power. In a preferred embodiment, the electric motor (12) may rotate at the speed of 800 rpm to 1,800 RPM so that the four power generators (16) also rotate at the same speed of 800 rpm to 1,800 RPM to generate the equal power by each generator (16).

According to an embodiment of the present invention, the two or more power generators (16) are connected with one another through an electric wire (17). In the preferred embodiment, as shown in FIG. 1, the four generators (16) are connected with each other through each one of the electric wires (17).

According to an embodiment of the present invention, one of the two or more power generators (16) is connected to a power transformer (18) to supply the generated power to a battery/grid (20) or the electric motor (12).

Figure 3:
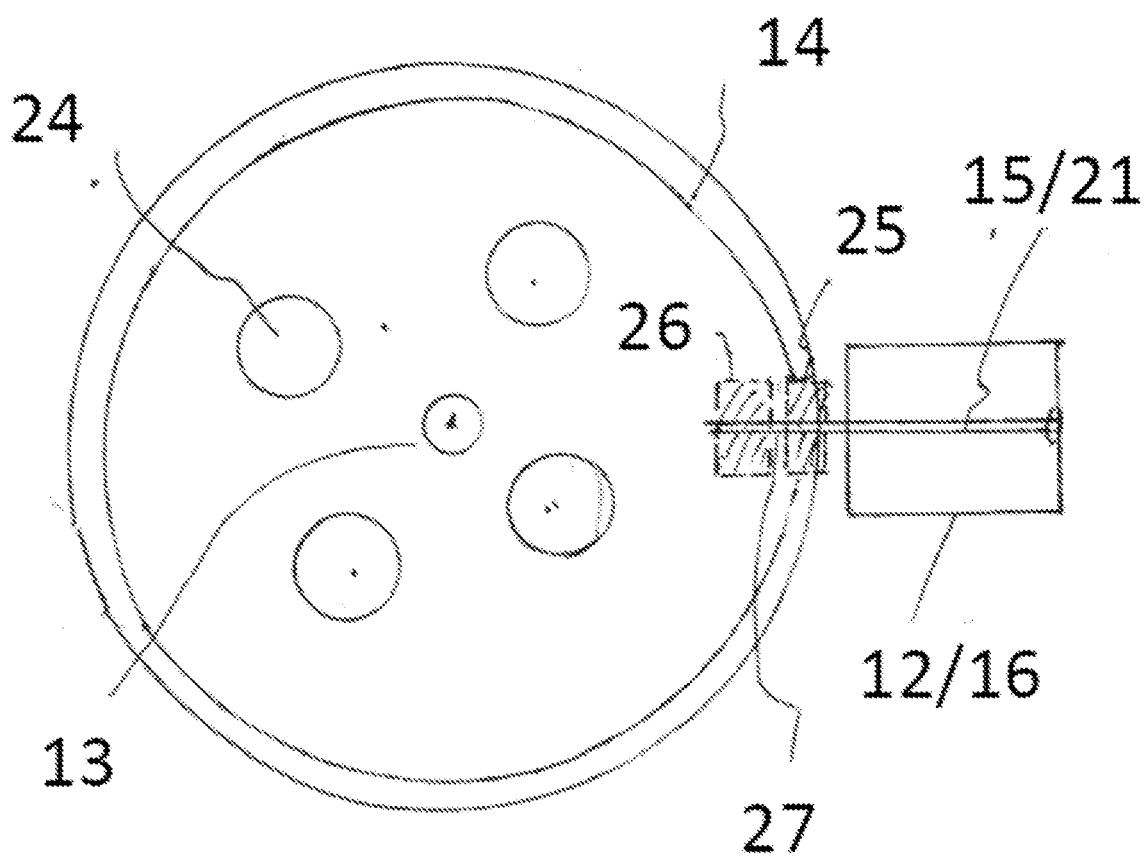
FIG. 3 is a Sectional view of generator or motor of an extended shaft attached pinion gear and magnet roller.
Figure 4:
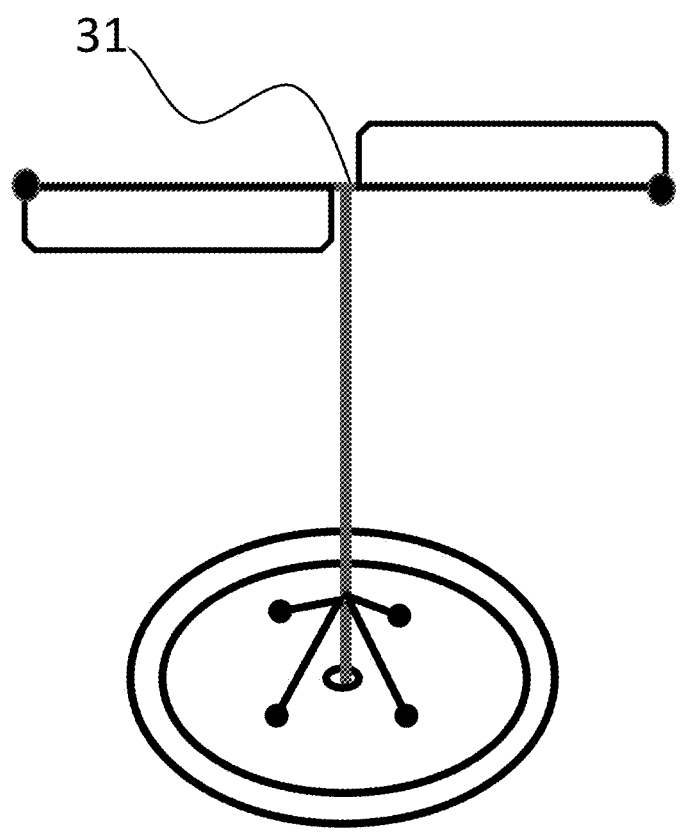
FIG. 4 is a sectional view of the circular rotating table connected to a wind turbine.

FIG. 3. Shown the present invention of magnet rollers (26) and pinion gear (25) attached to an extended shaft (27) of the generators or a motor. The magnet roller touches and pushing the rotating table with 50 to 100 lbs. force when rotating table, and that force increasing centripetal force greatly. The generator or motor (12/16), Shaft (15/21), gear table (14), hole (24), center post (13) are shown in the FIG. 1.

The present invention is to provide an emergency system is connect able connectable a vertical wind (31) turbine to the center post (13) and rotating together with the table in case of an electric motor stopped (not shown drawing), the freeway wind power is always powerful, so this invention is perfect of US government 300,000 of freeway electric vehicle (EV) charging system.

Another aspect of the present invention is to provide a method for generating electric power by using the above apparatus with power generators as described.

It should be understood that the exemplary embodiments described therein should be considered in a descriptive sense only and not for purposes of limitation. Descriptions of features or aspects within each embodiment should typically be considered as available for other similar features or aspects in other embodiments.

What is clamed is:

1. A portable power generating system comprising:
an electric motor and at least one generator having an extended shaft, wherein a pinion gear or a magnet roller is installed at the extended shaft, and the extended shaft is a rotation axis of the pinion gear or the magnet roller; and
a bevel gear round table,
wherein
the bevel gear round table is rotated by the electric motor,
the pinion gear or the magnet roller rotates on the bevel gear round table, producing an electric power that charges a battery or supplies the electric power to the electric motor,
a rotation axis of the pinion gear or the magnet roller and a rotation axis of the bevel gear round table are orthogonal to each other.

2. The portable power generating system of claim 1, further comprising a center post configured to hold the bevel gear round table, wherein the center post and the bevel gear round table are connected with each other through at least one thrust bearing.

3. The portable power generating system of claim 1, the at least one generator rotates at the same RPM and in the same direction as the electric motor.

4. The portable power generating system of claim 1, wherein the at least one generator includes two or more power generators, and the two or more power generators are connected with one another through an electric wire.

5. The portable power generating system of claim 4, one of the two or more power generators is connected to a power transformer to supply the generated power to a grid or the electric motor.

6. The Portable power generating system claim of 1, wherein the extended shaft is for connecting the magnet roller and attached to the at least one generator or the electric motor for increasing centripetal force.

7. The portable power generating system of claim 1, the magnet roller has 10 lbs. to 100 lbs. of a magnetic force and rotates on the bevel gear round table in one direction.

8. The portable power generating system of claim 1, wherein the system includes the battery for starting the system.

9. The portable power generating system of claim 1, wherein the at least one generator and the electric motor have predetermined weights and sizes.

10. The portable power generating system of claim 1, including at least one of a graphene wire, a CNT wire or composite wire of graphene/CNT/copper wires winded to the at least one generator.

11. The portable power generating system of claim 1, wherein the bevel gear round table includes a bevel gear or a spur gear.

12. The portable power generating system of claim 1, wherein the produced electric power is an AC power, and the AC power is converted, by a rectifier, to DC 800 volts to 900 volts charging the battery.

13. The portable power generating system of claim 1, wherein the bevel gear round table includes a wind turbine, and the bevel gear round table and the wind turbine rotate together at a same speed and in a same direction.

14. The portable power generating system of claim 1, wherein the extended shaft includes wind blades rotating together with the pinion gear at a same speed.

* * * * *